United States Patent
Katsunoi

(10) Patent No.: US 12,531,955 B2
(45) Date of Patent: Jan. 20, 2026

(54) IMAGE PROCESSING DEVICE AND IMAGE PROCESSING METHOD WITH SEQUENTIAL ERROR DETECTION

(71) Applicant: Ichiro Katsunoi, Kanagawa (JP)

(72) Inventor: Ichiro Katsunoi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 271 days.

(21) Appl. No.: 18/220,824

(22) Filed: Jul. 12, 2023

(65) Prior Publication Data

US 2024/0037887 A1    Feb. 1, 2024

(51) Int. Cl.
H04N 1/00    (2006.01)

(52) U.S. Cl.
CPC ..... *H04N 1/00718* (2013.01); *H04N 1/00748* (2013.01); *H04N 1/00779* (2013.01); *H04N 1/00793* (2013.01)

(58) Field of Classification Search
CPC ........... H04N 1/00718; H04N 1/00748; H04N 1/00779; H04N 1/00793
See application file for complete search history.

(56) References Cited

U.S. PATENT DOCUMENTS

| | | | | |
|---|---|---|---|---|
| 2001/0017717 A1* | 8/2001 | Ishida | ................ | H04N 1/00737 358/464 |
| 2005/0271296 A1* | 12/2005 | Tsuji | ................. | H04N 1/00681 382/289 |
| 2008/0252947 A1* | 10/2008 | Minamino | ........... | H04N 1/0455 358/494 |
| 2009/0161174 A1 | 6/2009 | Takeuchi et al. | | |
| 2010/0245870 A1* | 9/2010 | Shibata | .............. | H04N 1/00331 358/1.9 |
| 2012/0287482 A1* | 11/2012 | Sakai | ....................... | H04N 1/60 358/474 |
| 2015/0077801 A1 | 3/2015 | Katsunoi | | |
| 2016/0127613 A1 | 5/2016 | Katsunoi | | |
| 2019/0384523 A1 | 12/2019 | Nagumo et al. | | |
| 2020/0106918 A1* | 4/2020 | Nakamura | ........... | H04N 1/3873 |

(Continued)

FOREIGN PATENT DOCUMENTS

| | | |
|---|---|---|
| JP | 2010-154305 | 7/2010 |
| JP | 2014-176975 | 9/2014 |

(Continued)

*Primary Examiner* — Nicholas Pachol
(74) *Attorney, Agent, or Firm* — XSENSUS LLP

(57) ABSTRACT

In an image processing device, an image capturing section receives light reflected by a document, captures an image of the document with the light, and generates read data of the image. The light includes visible light and invisible light. The image includes a visible image and an invisible image. A first image processing circuit detects coordinates of first points on a boundary between the document and a white reference plate in the visible image and coordinates of second points on the boundary in the invisible image, calculates a first detection result, first detection error information, a second detection result, and second detection error information, and selects the first or second detection result based on the first and second error information. The calculation of the first detection result and the first error information and the calculation of the second detection result and the second error information are sequentially performed.

11 Claims, 11 Drawing Sheets

(56) References Cited

U.S. PATENT DOCUMENTS

| | | | | |
|---|---|---|---|---|
| 2020/0106919 A1* | 4/2020 | Nakamura | ......... | H04N 1/00718 |
| 2021/0185285 A1* | 6/2021 | Sun | ...................... | H04N 25/131 |
| 2021/0281712 A1* | 9/2021 | Nakamura | ......... | H04N 1/00737 |
| 2021/0385384 A1* | 12/2021 | Ohmiya | ............. | H04N 1/00681 |

FOREIGN PATENT DOCUMENTS

| | | |
|---|---|---|
| JP | 2020-053931 | 4/2020 |
| JP | 2021-141467 | 9/2021 |

* cited by examiner

IMAGE PROCESSING DEVICE AND IMAGE PROCESSING METHOD WITH SEQUENTIAL ERROR DETECTION

CROSS-REFERENCE TO RELATED APPLICATION

This patent application is based on and claims priority pursuant to 35 U.S.C. § 119(a) to Japanese Patent Application No. 2022-120705, filed on Jul. 28, 2022, in the Japan Patent Office, the entire disclosure of which is hereby incorporated by reference herein.

BACKGROUND

Technical Field

Embodiments of this disclosure relate to an image processing device and an image processing method.

Related Art

There is an image processing device that processes the image of a document read with an image sensor, for example. There is also a technique of reading image data of a document with light beams of different wavelengths and correcting the angle of the document in the image data, for example.

However, applying the above-described technique to an existing image processing device, for example, increases the image data to process, consequently increasing costs and man-hours for achieving the image processing device that performs the technique.

SUMMARY

In one embodiment of this invention, there is provided an image processing device that includes, for example, a light source, a white reference plate, an image capturing section, and a first image processing circuit. The light source irradiates a document with light. The light includes visible light and invisible light. The white reference plate is disposed behind the document to absorb the invisible light. The document reflects the light. The image capturing section receives the light reflected by the document, captures an image of the document with the light from the light source, and generates read data of the image. The first image processing circuit processes the image. The image includes a visible image being captured with the visible light and an invisible image being captured with an invisible light. The first image processing circuit detects coordinates of a plurality of first points on a boundary area between the document and the white reference plate in the visible image based on a shadow of the document cast on the white reference plate in the visible image. The first image processing circuit further detects coordinates of a plurality of second points on the boundary area between the document and the white reference plate in the invisible image based on incidence or non-incidence of light from the document and the white reference plate in the invisible image. The first image processing circuit calculates a first detection result and first detection error information. The first detection result represents a tilt of the document detected in the visible image based on the coordinates of the plurality of first points. The first detection error information represents accuracy of detection of the tilt of the document in the visible image. The first image processing circuit further calculates a second detection result and second detection error information. The second detection result represents a tilt of the document detected in the invisible image based on the coordinates of the plurality of second points. The second detection error information represents accuracy of detection of the tilt of the document in the invisible image. The first image processing circuit selects one of the first detection result of the visible image and the second detection result of the invisible image based on the first detection error information and the second detection error information. The first image processing circuit sequentially performs the calculation of the first detection result and the first detection error information and the calculation of the second detection result and the second detection error information.

In one embodiment of this invention, there is provided an image processing device that includes, for example, a light source, a background section, an image capturing unit, and a first image processing unit. The light source irradiates a document with light. The light includes visible light and invisible light. The background section absorbs the invisible light. The background section is disposed behind the document reflecting the light. The image capturing unit receives the light reflected by the document, captures an image of the document with the light from the light source, and generates read data of the image. The first image processing unit processes the image. The image includes a visible image being captured with the visible light and an invisible image being captured with the invisible light. The first image processing unit includes a first edge detection unit, a second edge detection unit, a tilt detection unit, and a detection result selection unit. The first edge detection unit detects coordinates of a plurality of first points on a boundary area between the document and the background section in the visible image based on a shadow of the document cast on the background section in the visible image. The second edge detection unit detects coordinates of a plurality of second points on the boundary area between the document and the background section in the invisible image based on incidence or non-incidence of light from the document and the background section in the invisible image. The tilt detection unit calculates a first detection result and first detection error information. The first detection result represents a tilt of the document detected in the visible image based on the coordinates of the plurality of first points. The first detection error information represents accuracy of detection of the tilt of the document in the visible image. The tilt detection unit further calculates a second detection result and second detection error information. The second detection result represents a tilt of the document detected in the invisible image based on the coordinates of the plurality of second points. The second detection error information represents accuracy of detection of the tilt of the document in the invisible image. The detection result selection unit selects one of the first detection result of the visible image and the second detection result of the invisible image based on the first detection error information and the second detection error information. The tilt detection unit sequentially performs the calculation of the first detection result and the first detection error information and the calculation of the second detection result and the second detection error information.

In one embodiment of this invention, there is provided an image processing method performed by an image processing device that includes a light source, a background section, and an image capturing unit. The light source irradiates a document with light. The light includes visible light and invisible light. The background section absorbs the invisible light. The background section is disposed behind the document reflecting the light. The image capturing unit receives the light reflected by the document, captures an image of the document with the light from the light source, and generates read data of the image. The image includes a visible image being captured with the visible light and an invisible image being captured with the invisible light. The image processing method includes, for example, detecting coordinates of a plurality of first points on a boundary area between the document and the background section in the visible image based on a shadow of the document cast on the background section in the visible image, detecting coordinates of a plurality of second points on the boundary area between the document and the background section in the invisible image based on incidence or non-incidence of light from the document and the background section in the invisible image, calculating a first detection result and first detection error information, and calculating a second detection result and second detection error information. The first detection result represents a tilt of the document detected in the visible image based on the coordinates of the plurality of first points. The first detection error information represents accuracy of detection of the tilt of the document in the visible image. The second detection result represents a tilt of the document detected in the invisible image based on the coordinates of the plurality of second points. The second detection error information represents accuracy of detection of the tilt of the document in the invisible image. The image processing method further includes selecting one of the first detection result of the visible image and the second detection result of the invisible image based on the first detection error information and the second detection error information. The calculating the first detection result and the first detection error information and the calculating the second detection result and the second detection error information are sequentially performed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
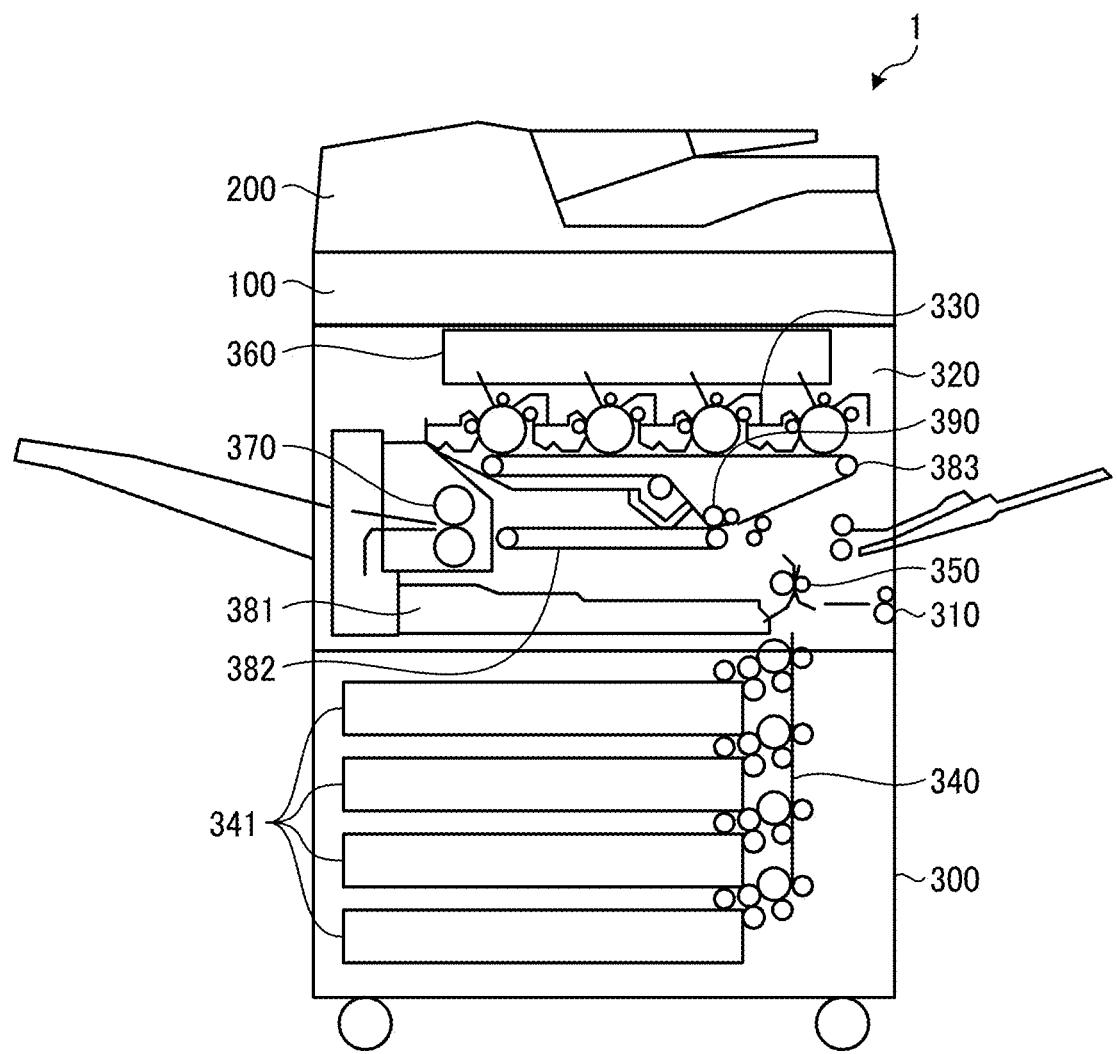
FIG. 1 is a schematic diagram illustrating a configuration example of an image forming apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description will be given of a configuration example of an image forming apparatus according to an embodiment of the present invention.

FIG. 1 is a schematic diagram illustrating a configuration example of an image forming apparatus 1 according to the embodiment. The image forming apparatus 1 is implemented as a multifunction peripheral (MFP) with a scanner function and a printer function, for example. The image forming apparatus 1, however, may further include any other function such as a copier function or a facsimile function.

As illustrated in FIG. 1, the image forming apparatus 1 includes an image reading device 100, a document feeding device 200, and a printing device 300.

The document feeding device 200 is implemented as an automatic document feeder (ADF), for example, to automatically transport a document as a scanning (reading) target to a reading position.

The image reading device 100 as an image processing device includes therein components such as an optical system, which includes a light source and mirrors, and a solid-state image sensor. Further, the upper surface of the image reading device 100 is equipped with a contact glass. In the image reading device 100, the document placed on the upper surface of the contact glass is irradiated with light from the light source, and reflected light from the document is read with the solid-state image sensor via the optical system.

The printing device 300 includes manual feed rollers 310, an image forming unit 320, image forming elements 330, a sheet supply unit 340, registration rollers 350, an optical writing device 360, a fixing device 370, a reversing mechanism 381, a second transfer belt 382, an intermediate transfer belt 383, and a transfer device 390.

The manual feed rollers 310 transport a manually fed medium, such as a sheet, into the image forming apparatus 1. The medium processable by the image forming apparatus 1 may be a sheet of paper including coated paper and thick paper, an overhead projector (OHP) sheet, a plastic film, a prepreg sheet, or a copper foil, for example; the medium is not limited to paper.

The sheet supply unit 340 includes multiple sheet feed cassettes 341. The sheet supply unit 340 picks up a medium such as a sheet (hereinafter simply referred to as the sheet) from one of the sheet feed cassettes 341, and supplies the sheet into the image forming apparatus 1.

The registration rollers 350 transport the sheet supplied from the manual feed rollers 310 or the sheet supply unit 340 to the second transfer belt 382.

The sheet transported from the registration rollers 350 is further transported to the transfer device 390 by the second transfer belt 382.

The image forming unit 320 has a tandem structure that rotatable houses four photoconductor drums for yellow (Y), magenta (M), cyan (C), and black (K) colors and includes four sets of image forming elements 330 corresponding to the four photoconductor drums. Each set of image forming elements 330 include a charging roller, a development device, a first transfer roller, a cleaner unit, and a discharger, which are disposed around the corresponding photoconductor drum. With the image forming elements 330 operating around the photoconductor drum, a toner image formed on the photoconductor drum is first-transferred onto the intermediate transfer belt 383 by the first transfer roller.

The intermediate transfer belt 383 is stretched by a drive roller and a driven roller and disposed in nips between the photoconductor drums and the first transfer rollers. With the rotation of the intermediate transfer belt 383, the toner images first-transferred to the intermediate transfer belt 383 are second-transferred onto the sheet transported on the second transfer belt 382 in the transfer device 390.

With the rotation of the second transfer belt 382, the sheet with the toner images transferred thereto is transported to the fixing device 370. The toner images transferred to the sheet are fixed thereon by the fixing device 370 as a color image, for example.

The sheet with the color image formed thereon is ejected onto a sheet ejection hay disposed outside the image forming apparatus 1. With the above-described operation, the image forming apparatus 1 forms the image on the sheet. The image formation may thus include a process of physically forming the image, such as printing the image on the sheet.

In two-sided printing, for example, the sheet is reversed by the reversing mechanism 381. The sheet with the image formed on the front surface thereof is reversed by the reversing mechanism 381 and transported back to the second transfer belt 382.

A detailed configuration example of the image reading device 100 of the embodiment will be described with FIGS. 2 and 3.

Figure 2:
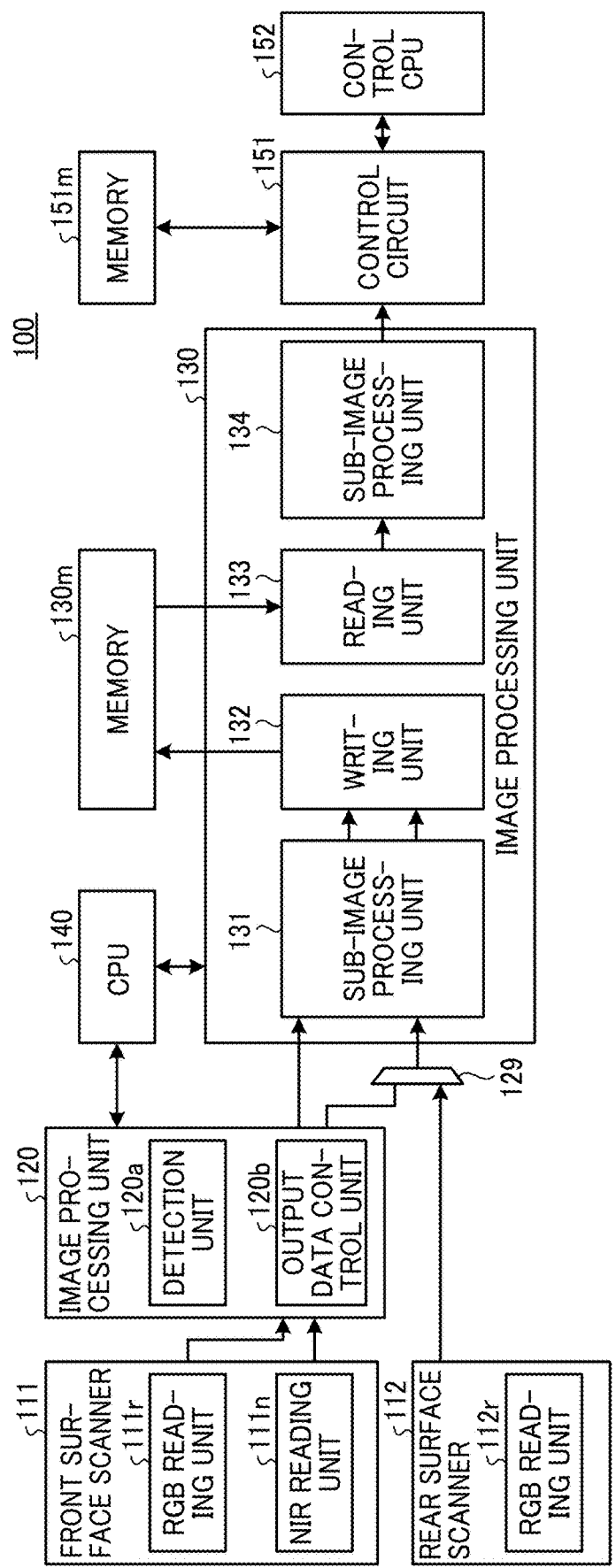
FIG. 2 is a block diagram illustrating a configuration example of an image reading device included in the image forming apparatus of the embodiment.

FIG. 2 is a block diagram illustrating a configuration example of the image reading device 100 of the embodiment. As illustrated in FIG. 2, the image reading device 100 includes a front surface scanner 111, a rear surface scanner 112, image processing units 120 and 130, a memory 130*m*, a central processing unit (CPU) 140, a control circuit 151, a memory 151*m*, and a control CPU 152.

The front surface scanner 111, which includes an RGB reading unit 111*r* and an NIR reading unit 111*n*, reads the front surface of the document.

With the image sensor, the RGB reading unit 111*r* captures images with visible light, e.g., red (R), green (G), and blue (B) light beams, emitted from the light source and reflected by the front surface of the document.

The three images thus captured with the R, G, and B light beams from the light source will be hereinafter referred to as the visible images. That is, an R image based on the R light beam, a G image based on the G light beam, and a B image based on the B light beam are captured as the visible images.

The visible light from the light source, however, is not limited to the R, G, and B light beams. For example, one or two of the three color light beams may be selected as desired as the visible light from the light source.

With the image sensor, the NIR reading unit 11 in captures an image with invisible light, such as near-infrared (NIR) light with a wavelength of 750 nanometers (nm) or greater, emitted from the light source and reflected by the front surface of the document. The image thus captured with the invisible light from the light source will be hereinafter referred to as the invisible image.

The invisible light from the light source, however, is not limited to the NIR For example, ultraviolet (UV) light with a wavelength of 380 nm or less outside the visible range may be used as the invisible light from the light source.

The front surface scanner 111 outputs the visible images and the invisible image, i.e., the R, G, and B images and the NIR image, read from the front surface of the document to the image processing unit 120 as read data.

The rear surface scanner 112, which includes an RGB reading unit 112*r*, reads the rear surface of the document. With the image sensor, the RGB reading unit 112*r* captures images with visible light, e.g., R, G, and B light beams, emitted from the light source and reflected by the rear surface of the document. The rear surface scanner 112 outputs the visible images, i.e., the R, G, and B images, read from the rear surface of the document to the image processing unit 130 as read data.

The image processing unit 120 as a first image processing unit (a first image processing circuit) is implemented by one or more CPUs, for example, and includes a detection unit 120*a* and an output data control unit 120*b*.

The detection unit 120*a* acquires the read data of the four images, i.e., the R, G, B, and NIR images, from the front surface scanner 111 and detects a skew of the document in each of the four images. Herein, the skew of the document refers to the tilt of the document in the image.

When the skew of the document is detected, the detection unit 120*a* transmits an interrupt notification of the skew detection result to the CPU 140. Based on the skew detection result, the detection unit 120*a* further selects and outputs the three visible images or the single invisible image, i.e., the R, G, and B images or the NIR image, to the CPU 140.

The output data control unit 120*b* outputs the visible images to the image processing unit 130 by controlling an output path to the image processing unit 130. That is, the output data control unit 120*b* outputs the visible images to a selector 129 to be compatible with a read data path of the image processing unit 130.

The selector 129, which is attached to the image processing unit 120, selects the output from the image processing unit 120 or the output from the rear surface scanner 112 to output the read data of the visible images of the front surface or the rear surface of the document to the image processing unit 130.

The CPU 140 accesses and controls both the image processing units 120 and 130. The CPU 140 (a control circuit) may be implemented as an image processing unit (IPU) dedicated to image processing, for example.

In response to reception of the interrupt notification of the skew detection result from the image processing unit 120, the CPU 140 acquires the skew detection result from the image processing unit 120. Based on the acquired skew detection result, the CPU 140 controls the image processing unit 130 to correct the skew of the document in the image.

The image processing unit 130 as a second image processing unit (a second image processing circuit) is implemented by one or more CPUs, for example, and includes a sub-image processing unit 131, a writing unit 132, a reading unit 133, and a sub-image processing unit 134.

The sub-image processing unit 131 performs image processing on the read data read by the front surface scanner 111 and the read data read by the rear surface scanner 112.

The writing unit 132 stores, in the memory 130*m*, the read data of the image processed by the sub-image processing unit 131. The reading unit 133 reads the read data of the image from the memory 130*m* by rotating the image 90 degrees or 270 degrees in accordance with a rotate-and-read method. In this process, the reading unit 133 performs the skew correction on the image based on the skew detection result under the control of the CPU 140. The sub-image processing unit 134 performs further image processing on the read data, and outputs the image-processed read data to the control circuit 151.

The memory 130*m* as a storage unit is an auxiliary storage device used in the above-described various image processing by the image processing unit 130.

The control circuit 151 is implemented as a large-scale integrated circuit (LSI), for example. The control circuit 151 stores, in the memory 151*m*, the image-processed read image acquired from the image processing unit 130. The control CPU 152 controls the control circuit 151.

The control circuit 151, the memory 151*m*, and the control CPU 152 are mounted on a control board included in the image forming apparatus 1, and function as a main controller that controls the entire image forming apparatus 1. The read data stored in the memory 151*m* is read in accordance with an instruction from a user for example, and is printed on a particular sheet by the printing device 300, for example.

Among the above-described components, the front surface scanner 111, the rear surface scanner 112, the image processing unit 130, the memory 130*m*, the control circuit 151, the memory 151*m*, and the control CPU 152 correspond to existing device components for performing the skew detection based on the visible images. An existing image reading device includes, in addition to these device components, a CPU or IPU that controls the image processing unit 130, for example.

As described above, in the image reading device 100 of the embodiment, the image processing unit 130 that performs the image processing on the visible images is preceded by the image processing unit 120 that processes both the read data of the visible images and the read data of the invisible image. This configuration enables the document skew detection using the invisible image as well as with the visible images.

The image processing unit 120 outputs the visible images to the image processing unit 130 in a format compatible with the processing of the image processing unit 130, thereby allowing the image processing unit 130 to process the visible images of the front surface of the document output from the image processing unit 120 and the visible images of the rear surface of the document output from the rear surface scanner 112.

With the image processing unit 120 thus provided separately from the image processing unit 130, the function of processing the invisible image is introduced to the image reading device 100 at low cost by use of the existing device components.

The image processing unit 120 may output, as necessary, the invisible image to the image processing unit 130 in addition to the visible images. In this case, in accordance with data paths of the image processing unit 130, the output data control unit 120*b* of the image processing unit 120 may output the visible images to a path of the image processing unit 130 for receiving the visible images of the front surface of the document, and may output the invisible image to a path of the image processing unit 130 for receiving the visible images of the rear surface of the document, for example.

The image reading device 100 of the embodiment includes, in place of the CPU or IPU that controls the image processing unit 130, the CPU 140 that accesses both the image processing units 120 and 130.

Even when the image processing unit 120 for performing the document skew detection in the visible images and the invisible image is provided separately from the image processing unit 130 for performing the image processing on the visible images, therefore, the image processing units 120 and 130 are operable in coordination with each other by the CPU 140.

The image processing unit 120 may be removable from the image reading device 100 of the embodiment. Alternatively, the image reading device 100 may have a switch for turning on or off the function of the image processing unit 120.

Thereby, the image reading device 100 is usable, as necessary, as an image processing device dedicated to the processing of the visible images. When the function of the image processing unit 120 is not used in this configuration, the image reading device 100 may cause the image processing unit 130 to perform the skew detection based on the visible images. Further, when the skew correction is unnecessary for some reason, the image reading device 100 may not use the function of the image processing unit 120.

A detailed configuration example of the image processing unit 120 of the embodiment will be described with FIG. 3.

Figure 3:
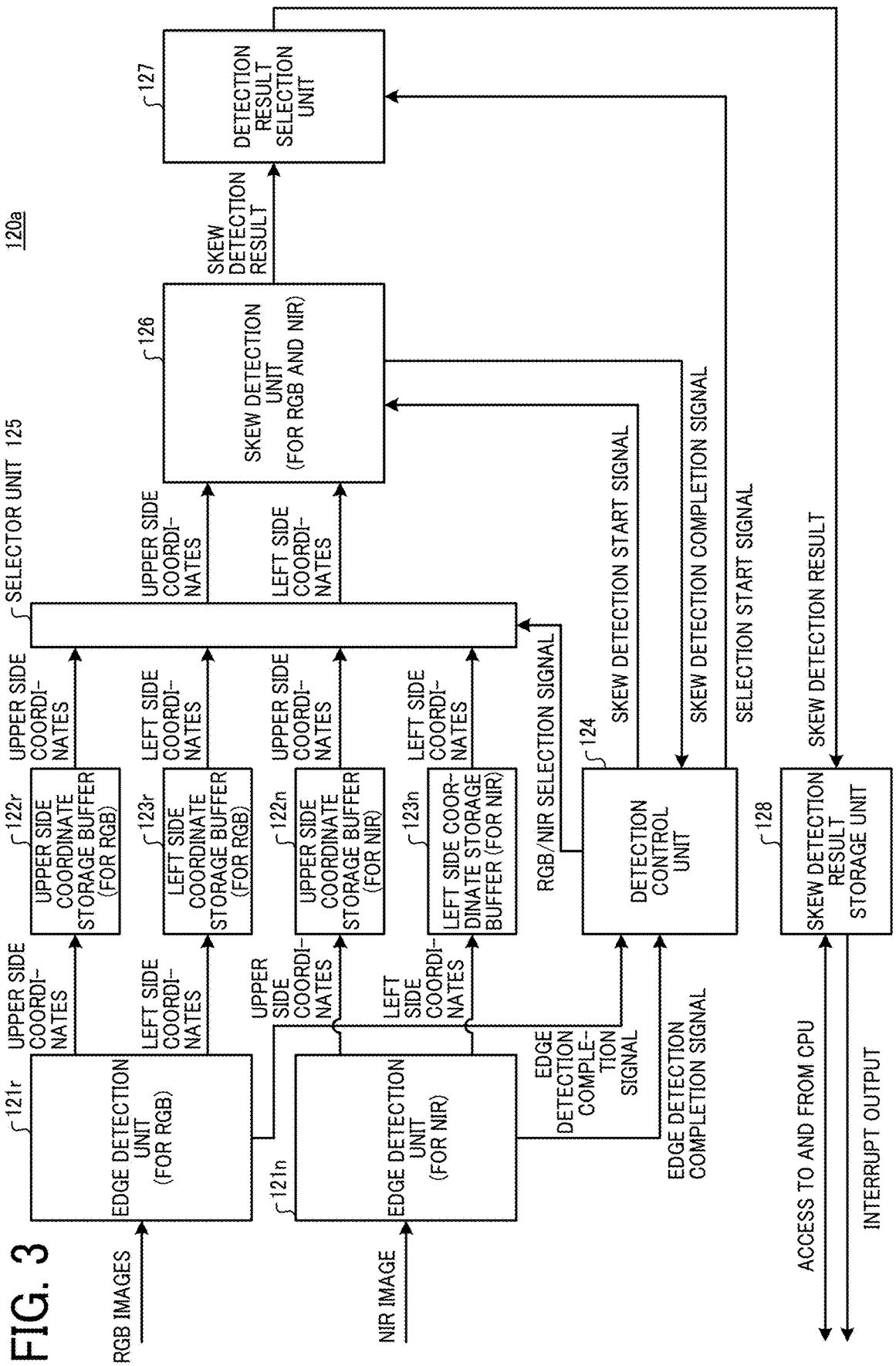
FIG. 3 is a block diagram illustrating a configuration example of an image processing unit included in the image reading device of the embodiment.

FIG. 3 is a block diagram illustrating a configuration example of the image processing unit 120 of the embodiment. FIG. 3 illustrates a configuration of the detection unit 120*a* of the image processing unit 120 excluding the output data control unit 120*b*.

As illustrated in FIG. 3, the detection unit 120*a* includes edge detection units 121*r* and 121*n*, upper side coordinate storage buffers 122*r* and 122*n*, left side coordinate storage buffers 123*r* and 123*n*, a detection control unit 124, a selector unit 125, a skew detection unit 126, a detection result selection unit 127, and a skew detection result storage unit 128. The edge detection unit 121*r* acquires the visible images, i.e., the R, G, and B images, from the front surface scanner 111 and detects the upper side and the left side of the document in each of the visible images. The two sides of the document detected by the edge detection unit 121*r*, however, are not limited to the upper side and the left side of the document, and may be any two adjacent sides of the document.

The edge detection unit 121*r* stores coordinate information of the detected upper side of the document in the upper side coordinate storage buffer 122*r*. The edge detection unit 121*r* further stores coordinate information of the detected left side of the document in the left side coordinate storage buffer 123*r*.

The edge detection unit 121*n* acquires the invisible image, i.e., the NIR image, from the front surface scanner 111 and detects the upper side and the left side of the document in the invisible image. The two sides of the document detected by the edge detection unit 121*n*, however, are not limited to the upper side and the left side of the document, and may be any two adjacent sides of the document.

The edge detection unit 121*n* stores coordinate information of the detected upper side of the document in the upper side coordinate storage buffer 122*n*. The edge detection unit 121*n* further stores coordinate information of the detected left side of the document in the left side coordinate storage buffer 123*n*.

After having stored the coordinate information in the upper side coordinate storage buffer 122*r* and the left side coordinate storage buffer 123*r*, the edge detection unit 121*r* transmits an edge detection completion signal to the detection control unit 124. Similarly, after having stored the coordinate information in the upper side coordinate storage buffer 122*n* and the left side coordinate storage buffer 123*n*, the edge detection unit 121*n* transmits an edge detection completion signal to the detection control unit 124.

In response to reception of the edge detection completion signal, the detection control unit 124 transmits a skew detection start signal to the skew detection unit 126. The detection control unit 124 further transmits a selection signal to the selector unit 125 to cause the selector unit 125 to select the visible images or the invisible image. The detection control unit 124 receives a skew detection completion signal from the skew detection unit 126, and transmits a selection start signal to the detection result selection unit 127 in accordance with the skew detection completion signal.

If the value of the selection signal is set to zero, for example, the selector unit 125 reads the coordinate information of the upper side and the left side of the document in the visible images from the upper side coordinate storage buffer 122*r* and the left side coordinate storage buffer 123*r*, and outputs the coordinate information to the skew detection unit 126.

If the value of the selection signal is set to one, for example, the selector unit 125 reads the coordinate information of the upper side and the left side of the document in the invisible image from the upper side coordinate storage buffer 122*n* and the left side coordinate storage buffer 123*n*, and outputs the coordinate information to the skew detection unit 126.

In response to acquisition of the coordinate information of the upper side and the left side of the document in the visible images, the skew detection unit 126 as a tilt detection unit detects the skew of the document in each of the visible images based on the acquired coordinate information in accordance with the skew detection start signal from the detection control unit 124. The skew detection unit 126 further generates detection error information that represents the accuracy of the skew detection in the visible image.

The skew detection unit 126 transmits the skew detection result and the detection error information of the visible images to the detection result selection unit 127. The skew detection unit 126 further transmits the skew detection completion signal to the detection control unit 124 to notify the completion of the skew detection of the visible images.

In response to acquisition of the coordinate information of the upper side and the left side of the document in the invisible image, the skew detection unit 126 detects the skew of the document in the invisible image based on the acquired coordinate information in accordance with the skew detection start signal from the detection control unit 124. The skew detection unit 126 further generates detection error information that represents the accuracy of the skew detection in the invisible image.

The skew detection unit 126 transmits the skew detection result and the detection error information of the invisible image to the detection result selection unit 127. The skew detection unit 126 further transmits the skew detection completion signal to the detection control unit 124 to notify the completion of the skew detection of the invisible image.

In response to acquisition of the skew detection result and the detection error information of the visible images and the skew detection result and the detection error information of the invisible image, the detection result selection unit 127 selects the skew detection result of the visible images or the skew detection result of the invisible image in accordance with the selection start signal from the detection control unit 124.

After receiving from the skew detection unit 126 both the skew detection completion signal corresponding to the visible images and the skew detection completion signal corresponding to the invisible image, the detection control unit 124 transmits the selection start signal to the detection result selection unit 127. With reference to the detection error information of the visible images and the detection error information of the invisible image, the detection result selection unit 127 selects the more accurate one of the skew detection result of the visible images and the skew detection result of the invisible image.

The detection result selection unit 127 stores the selected one of the skew detection result of the visible images and the skew detection result of the invisible image in the skew detection result storage unit 128. In response to acquisition of the skew detection result, the skew detection result storage unit 128 transmits the interrupt notification of the skew detection result to the CPU 140. The CPU 140 thereby acquires the skew detection result of the visible images or the invisible image stored in the skew detection result storage unit 128.

With FIGS. 4 to 7, a description will be given of an example of the hardware configuration of the front surface scanner 111 included in the image reading device 100 of the embodiment and an example of the reading operation by the front surface scanner 111.

Figure 4:
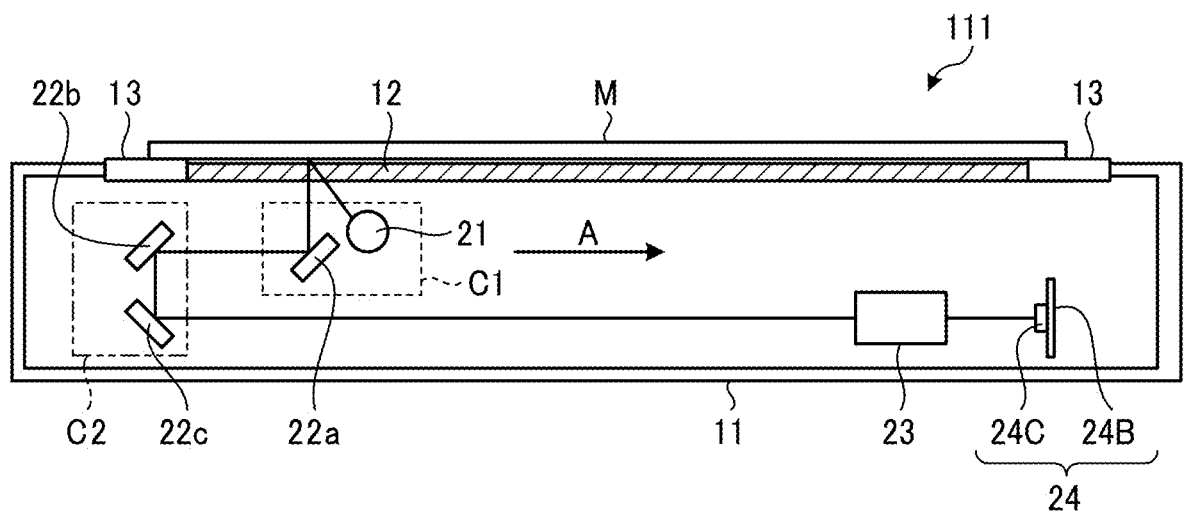
FIG. 4 is a schematic diagram illustrating an exemplary hardware configuration of a front surface scanner included in the image reading device of the embodiment.

FIG. 4 is a schematic diagram illustrating an exemplary hardware configuration of the front surface scanner 111 of the embodiment. As illustrated in FIG. 4, the front surface scanner 111 includes a main body 11, carriages C1 and C2, a lens unit 23, and an image capturing section 24.

The upper surface of the main body 11 is equipped with a contact glass 12. The main body 11 houses the carriages C1 and C2, the lens unit 23, and the image capturing section 24. The periphery of the contact glass 12 is surrounded by a frame-shaped background section 13. The background section 13 is implemented by a member that absorbs invisible light such as NIR light. The background section 13 may also be called a white reference plate. A document M is placed on the upper surface of the contact glass 12 such that the four sides of the document M cover part of the upper surface of the frame-shaped background section 13.

An optical system including a light source 21 is disposed in the carriages C1 and C2. The carriages C1 and C2 are movable in a direction A while maintaining equidistance from each other. The direction A may also be called the sub-scanning direction.

The carriage C1 includes the light source 21 and a mirror 22a. The light source 21 is a light emitting diode (LED) that emits light in the visible light range such as R, G, and B light beams or light in the invisible light range such as NIR light, for example. The light source 21 thus irradiates the document M placed on the contact glass 12 with the visible light or the invisible light. The visible light or the invisible light reflected back into the main body 11 by the document M is then reflected toward the carriage C2 by the mirror 22a.

The invisible light emitted from the light source 21 is partially absorbed by the background section 13 before reaching the document M. Further, part of the invisible light reflected by the document M is absorbed by the background section 13, not reaching the mirror 22a.

The carriage C2 includes a plurality of mirrors 22b and 22c. The visible light or the invisible light reflected by the mirror 22a is reflected toward the mirror 22c by the mirror 22b. The visible light or the invisible light reflected by the mirror 22b is then reflected toward the lens unit 23 by the mirror 22c.

The lens unit 23 forms an image on an image sensor 24C of the image capturing section 24 with the visible light or the invisible light reflected by the mirror 22c.

The image capturing section 24 (an image capturing unit) includes the image sensor 24C and a sensor board 24B on which the image sensor 24C is mounted. The image sensor 24C is, for example, a complementary metal oxide semiconductor (CMOS) image sensor that forms the image of the document M with the visible light or the invisible light from the light source 21. As well as the image sensor 24C, components such as a signal processing circuit are mounted on the sensor board 24B.

In the image sensor 24C, pixels each for converting an incident light amount into an electric signal are arranged in a matrix. Each of the pixels is provided with a color filter to transmit specifically light of a particular wavelength. The electric signals obtained from the pixels are transmitted to the signal processing circuit in a particular order at particular time intervals.

The image sensor 24C thereby captures images with the visible light beams such as R, G, and B light beams sequentially emitted from the light source 21 and reflected by the document M, the visible images such as the R, G, and B images are read. The image sensor 24C further captures an image with the invisible light such as NIR light emitted from the light source 21 and reflected by the document M; the invisible image such as the NIR image is read.

The carriages C1 and C2, the lens unit 23, and the image capturing section 24 are included in both the RGB reading unit 111r and the NIR reading unit 111n of the front surface scanner 111 as components common to the RGB reading unit 111r and the NIR reading unit 111n. That is, the RGB reading unit 111r and the NIR reading unit 111n are the carriages C1 and C2, the lens unit 23, and the image capturing section 24. The RGB reading unit 111r and the NIR reading unit 111n may also include the background section 13, for example.

The thus-configured optical system of the front surface scanner 111 is also called a reducing optical system. The front surface scanner 111, however, may include another type of optical system such as a non-magnifying optical system. The non-magnifying optical system is also called a close-contact optical system or a contact image sensor (CIS), for example.

The rear surface scanner 112 may have a configuration similar to that of the front surface scanner 111 illustrated in FIG. 4. The rear surface scanner 112 captures the images of the document M placed on the contact glass 12 by emitting, from the light source 21, the visible light beams such as R, G, and B light beams out of the light in the visible light range and the light in the invisible light range.

Figure 5:
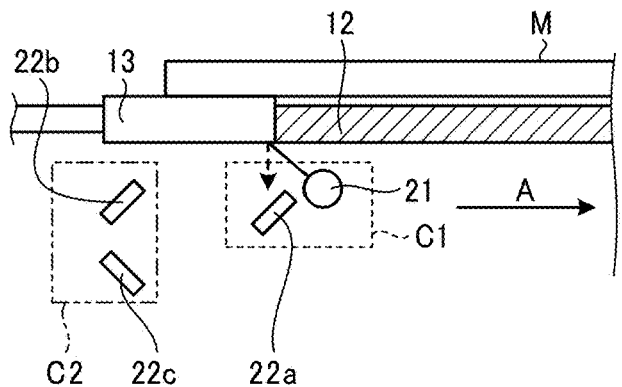
FIG. 5, FIG. 6, and FIG. 7 are schematic diagrams illustrating an example of a reading operation by the front surface scanner of the embodiment.
Figure 6:
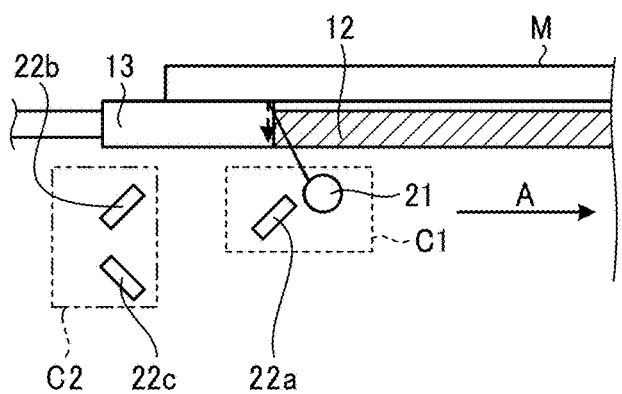
Figure 7:
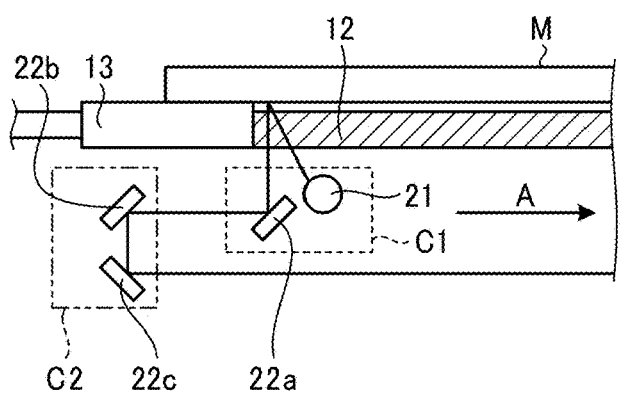

FIGS. 5, 6, and 7 are schematic diagrams illustrating an example of the reading operation by the front surface scanner 111 of the embodiment. FIGS. 5 to 7 illustrate an example in which the reading operation is performed with the invisible light such as NIR light emitted from the light source 21 of the front surface scanner 111.

In the start phase or in the standby phase in which the reading of the document M is not taking place, the front surface scanner 111 emits light beams of different wavelengths such as the visible light and the invisible light from the light source 21 toward the background section 13 when the mirror 22a is at a standby position immediately below the background section 13. Then, the front surface scanner 111 reads the light beams reflected by the background section 13 to set the reading intensity, i.e., the reference gain.

As illustrated in FIGS. 5 to 7, to read the document M, the front surface scanner 111 emits the invisible light from the light source 21 while moving the carriages C1 and C2 in the direction A, i.e., the sub-scanning direction, with a certain distance kept between the carriages C1 and C2. Then, with the light reflected by the document M and received via the lens unit 23, the image sensor 24C captures the image of the document M.

As illustrated in FIG. 5, when the mirror 22a of the carriage C1 is located below the background section 13, part of the invisible light emitted toward the document M from the light source 21 is absorbed by the background section 13, not reaching the document M. When the mirror 22a is at the position illustrated in FIG. 5, therefore, the reflected light from the document M is not incident on the mirror 22a.

As illustrated in FIG. 6, as the carriages C1 and C2 move in the direction A, the mirror 22a of the carriage C1 reaches a position below the boundary between the background section 13 and the contact glass 12. At this position, the invisible light emitted from the light source 21 and reflected by the document M is partially absorbed by the background section 13 before reaching the mirror 22a. When the mirror 22a is at the position illustrated in FIG. 6, therefore, the reflected light from the document M is still not incident on the mirror 22a.

As illustrated in FIG. 7, as the carriages C1 and C2 move further in the direction A, the mirror 22a of the carriage C1 moves away from the position immediately below the background section 13 to a position below the contact glass 12. At this position, the invisible light emitted from the light source 21 and reflected by the document M partially reaches the mirror 22a without being blocked by the background section 13. As illustrated in FIG. 7, therefore, the reflected light from the document M is incident on the mirror 22a at the position away from the background section 13. Then, with the reflected light received via the mirrors 22b and 22c and the lens unit 23, the image sensor 24C captures the image of the document M.

As described above, the reflected light from the document M is not incident on the mirror 22a in FIGS. 5 and 6, but is incident thereon in FIG. 7. The edge detection unit 121n of the image reading device 100 detects a boundary area between the incidence and non-incidence of the reflected light as an edge of the document M in the invisible image.

The front surface scanner 111 and the rear surface scanner 112 capture the visible images through an operation similar to that illustrated in FIGS. 5 to 7. To capture the visible images, the carriages C1 and C2 are moved each time the light source 21 emits the visible light such as R, G, or B light in place of the invisible light to capture the corresponding visible image. The edge detection unit 121r of the image reading device 100 detects, as the edge of the document M, a boundary area of a shadow of the document M cast on the background section 13 by the visible light hitting the document M.

With FIGS. 8 and 9, a description will be given of an example of the edge detection operation and an example of the skew detection operation performed by the image processing unit 120 of the image reading device 100 of the embodiment.

Figure 8:
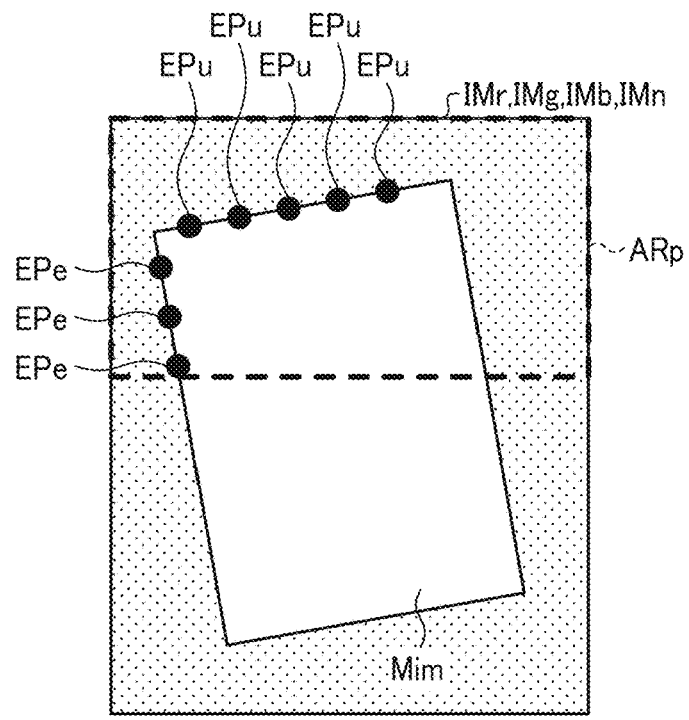
FIG. 8 is a schematic diagram illustrating an example of an edge detection operation by the image processing unit of the embodiment.

FIG. 8 is a schematic diagram illustrating an example of the edge detection operation by the image processing unit 120 of the embodiment. As illustrated in FIG. 8, the edge detection units 121r and 121n of the image processing unit 120 detect the edge of the document M in the visible images and the invisible image, respectively. Herein, the image of the document M included in the visible images and the invisible image will be described as the document Mim.

More specifically, the edge detection unit 121r detects a plurality of edge points EPu and a plurality of edge points and EPe in the upper half of an R image IMr, for example, as a processing target area ARp. The edge points EPu are on the upper side of the document Mim included in the R image IMr. The edge points EPe are on the left side of the document Mim included in the R image IMr. Which part of the visible image such as the R image IMr is to be set as the processing target area ARp is determined under the control of the CPU 140 using parameters.

To detect the edge points EPu and EPe in the visible image such as the R image IMr, the edge detection unit 121r detects the shadow of the document Mim cast on the background section 13, and identifies the edge points EPu and EPe based on the detected shadow of the document Mim.

The edge detection unit 121r further detects the edge points EPu and EPe on the upper side and the left side of the document Mim in each of a G image IMg and a B image IMb similarly as in the R image IMr.

The edge detection unit 121r stores, in the upper side coordinate storage buffer 122r, the coordinate information of the edge points EPu of the document Mim thus detected in the visible images such as the R image IMr, the G image IMg, and the B image IMb. The edge detection unit 121r further stores, in the left side coordinate storage buffer 123r, the coordinate information of the edge points EPe of the document Mim thus detected in the visible images such as the R image IMr, the G image IMg, and the B image IMb.

The edge detection unit 121n, on the other hand, detects the edge points EPu and EPe in the upper half of an NIR image IMn, for example, as the processing target area ARp. The edge points EPu are on the upper side of the document Mim included in the NIR image IMn. The edge points EPe are on the left side of the document Mim included in the NIR image IMn. Which part of the invisible image such as the NIR image IMn is to be set as the processing target area ARp is also determined under the control of the CPU 140 using parameters.

In the invisible image such as the NIR image IMn, there is no incidence of the reflected light from the area in which the background section 13 is disposed. Therefore, the boundary area between the background section 13 and the document Mim is identifiable in the NIR image IMn. To detect the edge points EPu and EPe in the invisible image, therefore, the edge detection unit 121n detects the boundary area between the background section 13 and the document Mim, and identifies the edge points EPu and EPe based on the detected boundary area.

The edge detection unit 121n stores, in the upper side coordinate storage buffer 122n, the coordinate information of the edge points EPu of the document Mim thus detected in the invisible image such as the NIR image IMn. The edge detection unit 121n further stores, in the left side coordinate storage buffer 123n, the coordinate information of the edge points EPe of the document Mim thus detected in invisible image such as the NIR image IMn.

The edge detection of the document Mim in the visible images by the edge detection unit 121r and the edge detection of the document Mim in the invisible image by the edge detection unit 121n are performed in parallel by parallel processing, for example.

Figure 9:
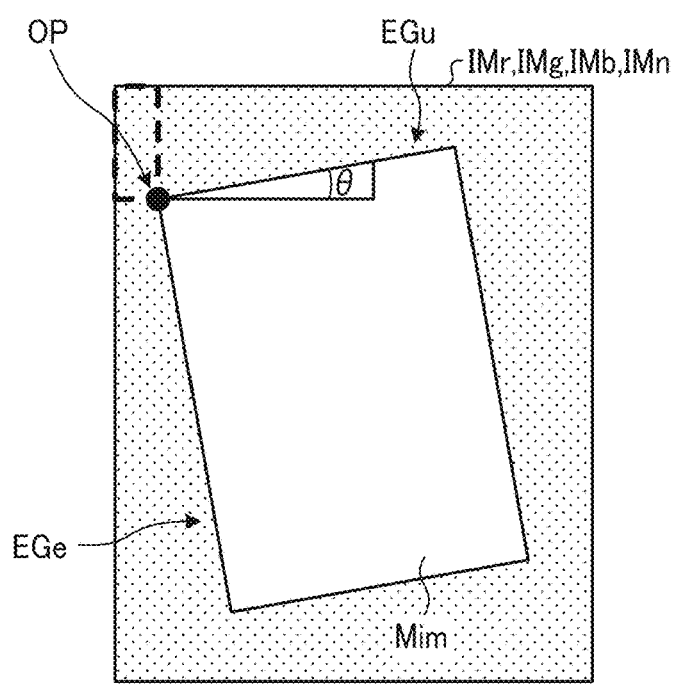
FIG. 9 is a schematic diagram illustrating an example of a skew detection operation by the image processing unit of the embodiment.

FIG. 9 is a schematic diagram illustrating an example of the skew detection operation by the image processing unit 120 of the embodiment.

As illustrated in FIG. 9, the skew detection unit 126 of the image processing unit 120 detects the skew of the document Mim in the visible images and the invisible image based on the coordinate information of the edge points EPu and EPe detected by the edge detection units 121r and 121n.

More specifically, based on the coordinate information of the edge points EPu and EPe of the document Mim detected in the R image IMr, for example, the skew detection unit 126 calculates the coordinates of the intersection point of an upper side EGu and a left side EGe of the document Mim as original coordinates OP. The skew detection unit 126 further calculates a tilt angle $\theta$ of the upper side EGu of the document Mim to the horizontal direction.

The skew detection unit 126 outputs the original coordinates OP and the tilt angle $\theta$ to the detection result selection unit 127 as the skew detection result of the document Mim in the R image IMr. The skew detection unit 126 further calculates the detection error information representing the accuracy of the skew detection, and outputs the calculated detection error information to the detection result selection unit 127 as well as the skew detection result.

Herein, the skew detection unit 126 performs the skew detection based on the settings of various threshold values under the control of the CPU 140 using parameters. The skew detection unit 126 compares the various threshold values with the values calculated in the skew detection, for example, to calculate the detection error information representing the accuracy of the skew detection.

The skew detection unit 126 further detects the skew of the document Mim in each of the G image IMg and the B image IMb similarly as in the R image IMr. The skew detection unit 126 then calculates the skew detection result and the detection error information, and outputs the skew detection result and the detection error information to the detection result selection unit 127.

Based on the coordinate information of the edge points EPu and EPe of the document Mim detected in the NIR image IMn, for example, the skew detection unit 126 further calculates the coordinates of the intersection point of the upper side EGu and the left side EGe of the document Mim as the original coordinates OP.

The skew detection unit 126 compares the various threshold values set under the control of the CPU 140 using parameters with the values calculated in the skew detection, for example, to calculate the detection error information representing the accuracy of the skew detection.

The skew detection unit 126 outputs the skew detection result and the detection error information calculated from the invisible image such as the NIR image IMn to the detection result selection unit 127.

The skew detection unit 126 sequentially performs the skew detection of the document Mim in the visible images and the skew detection of the document Mim in the invisible image by series processing, for example. The order of the skew detection of the document Mim in the visible images and the skew detection of the document Mim in the invisible image is set as desired.

As described above, the detection control unit 124 of the image processing unit 120 transmits the selection signal of the visible images and the selection signal of the invisible image to the selector unit 125 in a desired order. In accordance with the order of outputs from the selector unit 125, the skew detection unit 126 sequentially processes the visible images and the invisible image. Each time the processing of the visible images or the invisible image is completed, the skew detection unit 126 transmits the skew detection completion signal to the detection control unit 124.

When the skew detection completion signal is received twice, the detection control unit 124 transmits the selection start signal to the detection result selection unit 127. Based on the detection error information of the visible images and the detection error information of the invisible image received from the skew detection unit 126, the detection result selection unit 127 selects and outputs the skew detection result of the visible images or the skew detection result of the invisible image to the CPU 140.

The accuracy of the skew detection may vary depending on the sheet quality or type of the document M, for example. For instance, depending on the sheet quality or type of the document M, the document M may reflect the visible light such as R, G, or B light more easily than the invisible light, or may reflect the invisible light such as NIR light more easily than the visible light. Further, in the skew detection in the visible images, the shadow casting of the document M on the background section 13 may become unstable depending on the sheet quality or type of the document M, consequently reducing the accuracy of the skew detection.

The detection control unit 124 compares the detection error information of the visible images and the detection error information of the invisible image acquired from the skew detection unit 126, and selects the more accurate one of the skew detection result of the visible images and the skew detection result of the invisible image.

With FIG. 10, a description will be given of an example of the reading operation and an example of the skew correction operation performed by the image processing unit 130 of the image reading device 100 of the embodiment.

Figure 10:
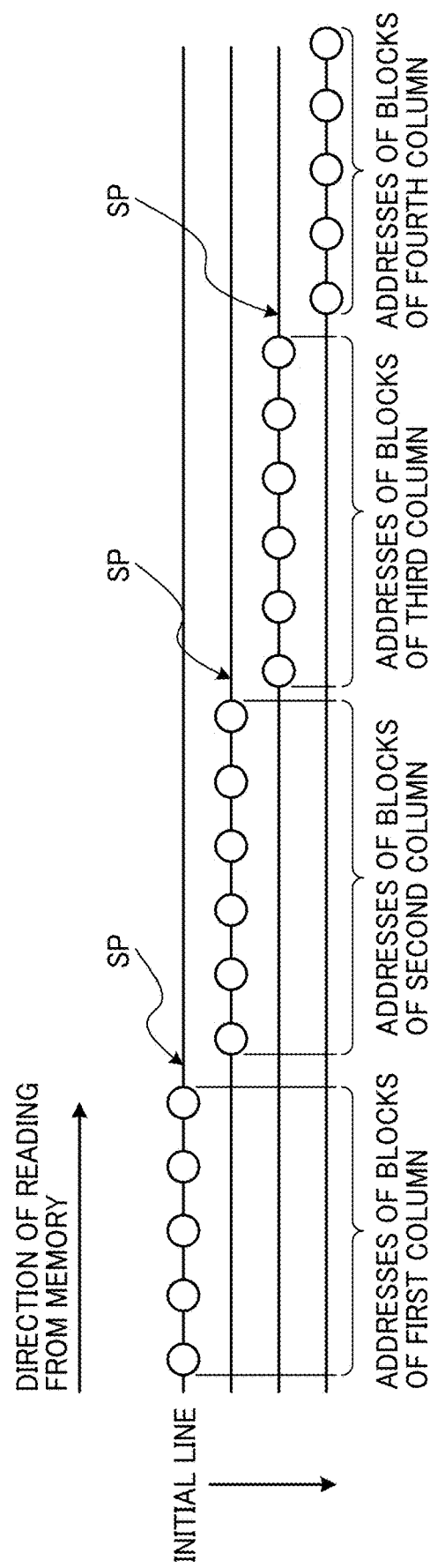
FIG. 10 is a schematic diagram illustrating an example of a reading operation by another image processing unit of the embodiment.

FIG. 10 is a schematic diagram illustrating an example of the reading operation by the image processing unit 130 of the embodiment. As illustrated in FIG. 10, the reading unit 133 of the image processing unit 130 reads the read data, which has been processed by the sub-image processing unit 131 of the image processing unit 130 and stored in the memory 130m by the writing unit 132, while performing the skew correction.

More specifically, the reading unit 133 employs the rotate-and-read method of reading the read data with addresses of the read data rotated 90 degrees or 270 degrees.

The read data of the visible image such as the R, G, or B image is stored in the memory 130m by the writing unit 132, with the visible image divided into a plurality of blocks each assigned with an address, for example. The reading unit 133 reads a plurality of addresses of some of the blocks forming each of a plurality of columns of the visible image from the initial line on the left side of the visible image, i.e., from the first column on the left side of the visible image to the second, third, and subsequent columns, for example. Then, the reading unit 133 horizontally rearranges the thus-read addresses.

In this process, the CPU 140 controls read addresses for reading from the memory 130m to cause the reading unit 133 to read the read data in the order of skew-corrected addresses. Specifically, the CPU 140 sets read address switching points SP for the blocks of the plurality of columns forming the visible image.

The reading unit 133 reads the addresses of some of the blocks forming the first column on the left side of the visible image, and horizontally rearranges the read addresses. Then, at a switching point SP specified by the CPU 140, the reading unit 133 switches to the addresses of the blocks forming the second column on the left side of the visible image to read the addresses of some of the blocks forming the second column, and horizontally rearranges the read addresses. When reaching the next switching point SP, the reading unit 133 switches to the addresses of the blocks forming the third column on the left side of the visible image to read the addresses of some of the blocks forming the third column, and horizontally rearranges the read addresses.

As described above, the reading unit 133 reads up to the address of an intermediate block of the first column, horizontally rearranges the read addresses, shifts to the second column to read up to the address of an intermediate block of the second column, horizontally rearranges the read addresses, shifts to the third column to read up to the address of an intermediate block of the third column, and horizontally rearranges the read addresses. The reading unit 133 repeats this process to read the visible image as rotated 90 degrees or 270 degrees, while performing, the skew correction on the visible image.

Figure 11:
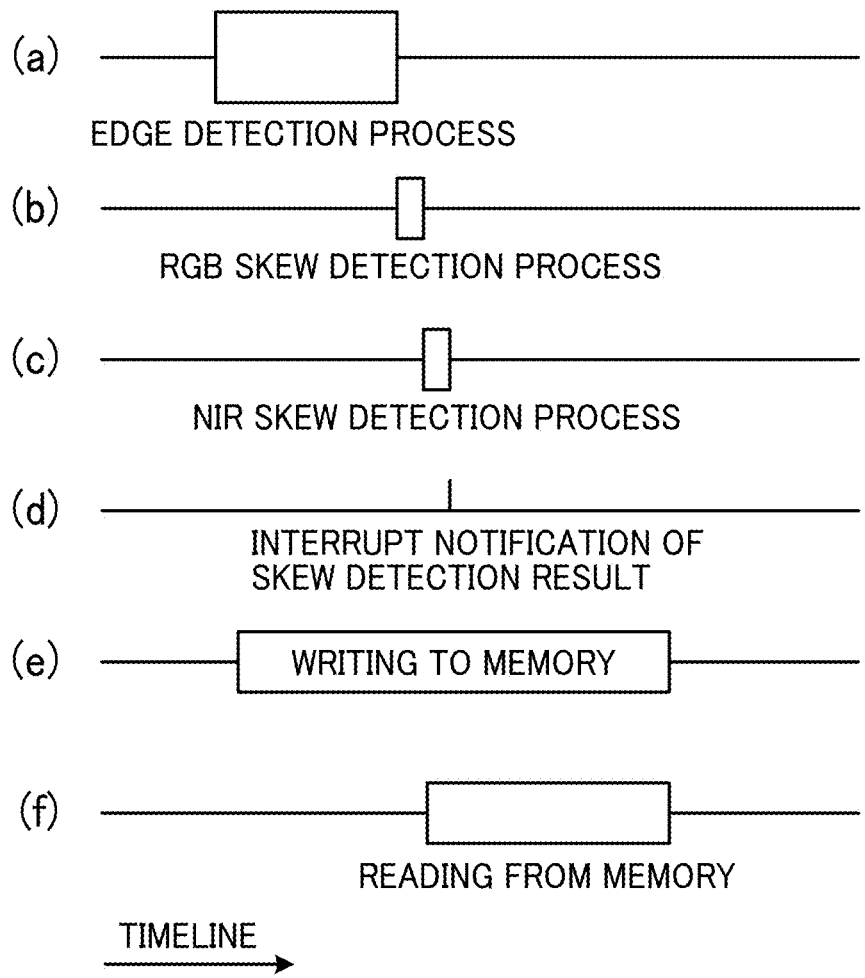
FIG. 11 is a diagram illustrating a chronological order of operations of units included in the image reading device of the embodiment.

Operations of units included in the image processing units 120 and 130 will be chronologically described with FIG. 11.

FIG. 11 is a diagram illustrating a chronological order of operations performed by units of the image reading device 100 of the embodiment.

As illustrated in (a) of FIG. 11, the edge detection units 121r and 121n of the image processing unit 120 first detect the edges of the upper side and the left side of the document in the visible images and the invisible image. The edge detection process of the edge detection unit 121r and the edge detection process of the edge detection unit 121n are performed in parallel.

As illustrated in (b) and (c) of FIG. 11, after the edge detection processes of the edge detection units 121r and 121n are completed, the skew detection unit 126 sequentially performs the document skew detection in the visible images and the document skew detection in the invisible image. The order of the document skew detection in the visible images and the document skew detection in the invisible image is set as desired.

As illustrated in (d) of FIG. 11, after the skew detection unit 126 completes both the document skew detection in the visible images and the document skew detection in the invisible image; the image processing unit 120 transmits the interrupt notification of the skew detection result to the CPU 140.

As illustrated in (e) of FIG. 11, the writing unit 132 of the image processing unit 130 acquires the read data of the visible images from the output data control unit 120*b*, and starts writing the read data to the memory 130*m*.

After particular image processing is performed on the visible images of the front surface of the document received from the front surface scanner 111, the output data control unit 120*b* transfers the image-processed visible images to the image processing unit 130 independently of the processing of the detection unit 120*a* including the edge detection units 121*r* and 121*n* and the skew detection unit 126.

Therefore, the writing unit 132 of the image processing unit 130 starts writing the read data to the memory 130*m* with a slight delay from the start of the edge detection processes by the edge detection units 121*r* and 121*n* of the image processing unit 120 but without wait for the skew detection unit 126 to complete the skew detection. The speed of writing of the writing unit 132 to the memory 130*m*, however, depends on the speed of transferring the read data to the image processing unit 120 from the front surface scanner 111. That is, the front surface scanner 111 sequentially reads parts of the document, and sequentially transfers read data items of read areas of the document to the image processing unit 120. Therefore, there is a limitation in increasing the writing speed of the image processing unit 130.

As illustrated in (f) of FIG. 11, after the completion of the skew detection process by the skew detection unit 126, the reading unit 133 of the image processing unit 130 starts reading the read data from the memory 130*m* under the control of the CPU 140, which has received the interrupt notification of the skew detection result.

In this process, the reading unit 133 reads the read data while performing the skew correction under the control of the CPU 140. For this reason, the reading unit 133 starts reading the read data after the completion of the skew detection process by the skew detection unit 126.

The image processing unit 120 includes the single skew detection unit 126, for example. The skew detection unit 126 therefore performs the skew detection in the visible images and the skew detection in the invisible image by series processing. Consequently, the transmission of the interrupt notification of the skew detection result and the start of the reading by the reading unit 133 in response to the interrupt notification are delayed compared to, for example, an image processing unit including a plurality of skew detection units to perform the skew detection in the visible images and the skew detection in the invisible image by parallel processing.

While there is a limitation in increasing the writing speed of the writing unit 132, the reading speed of the reading unit 133 simply depends on the internal operation clock frequency of the image processing unit 130 and the clock frequency of the operation between the image processing unit 130 and the memory 130*m*. Therefore, the reading speed of the reading unit 133 is readily adjustable with the above-described clock frequencies. For example, the reading speed of the reading unit 133 may be adjusted to be faster than the writing speed of the writing unit 132.

In the image processing unit 130 of the embodiment, therefore, the reading speed of the reading unit 133 is adjusted such that the writing of the read data to the memory 130*m* by the writing remit 132 and the reading of the read data from the memory 130*m* by the reading unit 133 are completed substantially at the same time.

Even if the completion of the skew detection by the skew detection unit 126 and the start of reading the read data by the reading unit 133 are delayed, therefore, such delay does not substantially affect the overall performance of the image reading device 100. That is, the present embodiment prevents an increase in circuit size by reducing the number of skew detection units, while preventing a decline in the performance of the image reading device 100.

An example of the image processing by the image reading device 100 of the embodiment will be described with FIG. 12 to 14.

Figure 12:
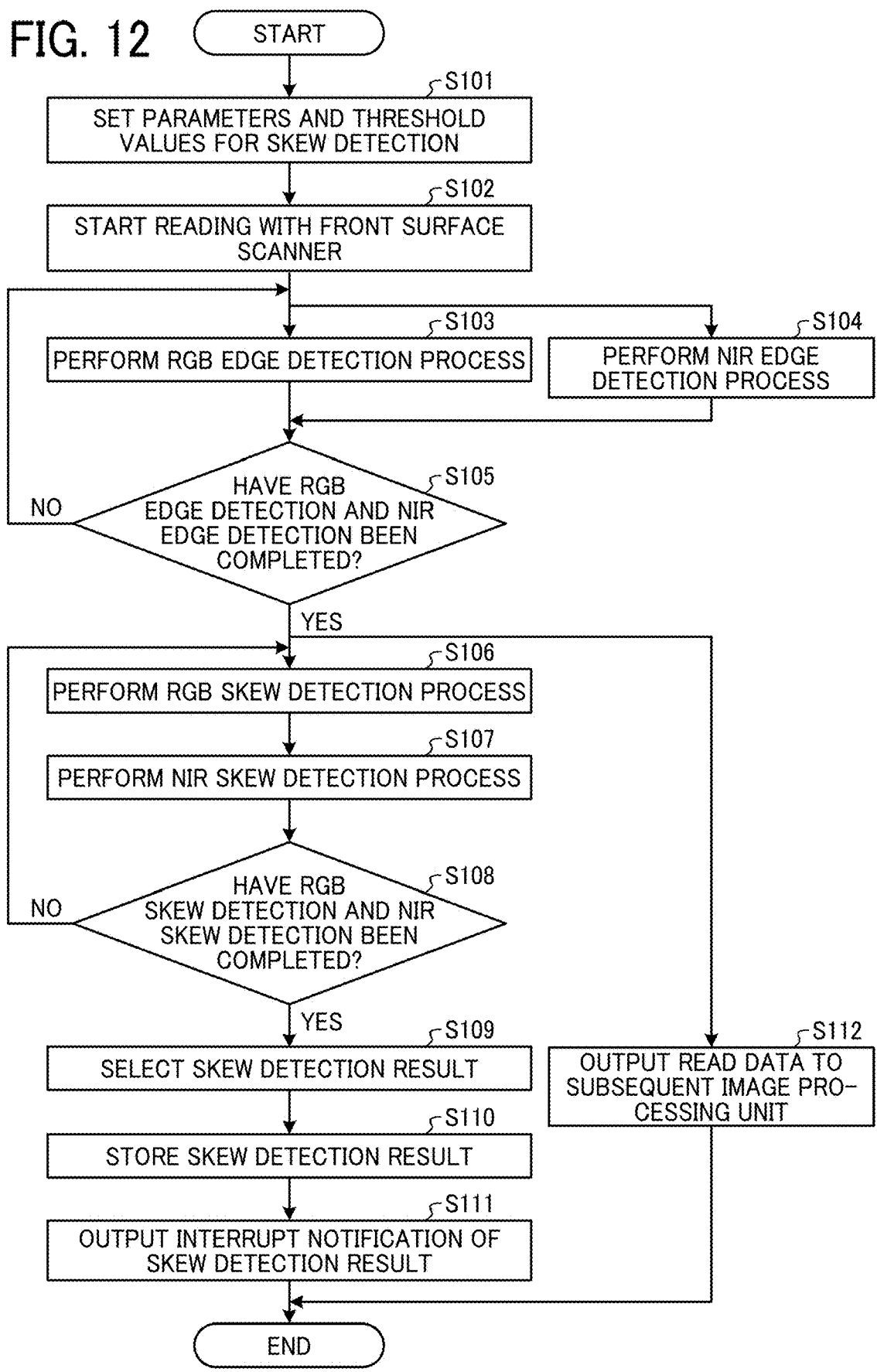
FIG. 12 is a flowchart illustrating an exemplary procedure of image processing by the image processing unit of the embodiment.

FIG. 12 is a flowchart illustrating an exemplary procedure of image processing by the image processing unit 120 of the embodiment. As illustrated in FIG. 12, the CPU 140 sets, in the image processing unit 120, parameters and threshold values related to the skew detection (step S101). The parameters include a parameter for switching between the use and the non-use of the skew detection function of the image processing unit 120, for example. The threshold values include various threshold values used to assess the accuracy of the skew detection and calculate the detection error information, for example.

When a document is set on the front surface scanner 111 and the reading of the document starts, read data items are sequentially transferred to the image processing unit 120 (step S102). In the image processing unit 120, the edge detection unit 121*r* detects the edges of the upper side and the left side of the document in the visible images (step S103). Further, the edge detection unit 121*n* detects the edges of the upper side and the left side of the document in the invisible image (step S104). The process of step S103 and the process of step S104 are performed in parallel by the edge detection units 121*r* and 121*n*, respectively.

The detection control unit 124 of the image processing unit 120 determines whether the process of step S103 and the process of step S104 have been completed (step S105). If it is determined that the process of step S103 and the process of step S104 have not been completed (NO at step S105), the detection control unit 124 allows the edge detection units 121*r* and 121*n* to continue the respective edge detection processes (steps S103 and S104).

If it is determined that the process of step S103 and the process of step S104 have been completed (YES at step S105), the skew detection unit 126 of the image processing unit 120 receives the skew detection start signal from the detection control unit 124, and performs the document skew detection in the visible images such as the R, G, and B images, for example (step S106). The skew detection unit 126 further performs the document skew detection in the invisible image such as the NIR image, for example (step S107). The order of the document skew detection in the visible images and the document skew detection in the invisible image is changeable.

The detection control unit 124 determines whether the process of step S106 and the process of step S107 have been completed (step S108). If it is determined that the process of step S106 and the process of step S107 have not been completed (NO at step S108), the detection control unit 124 allows the skew detection unit 126 to continue the skew detection processes (steps S106 and S107).

If it is determined that the process of step S106 and the process of step S107 have been completed (YES at step S108), the detection result selection unit 127 of the image processing unit 120 receives the selection start signal from the detection control unit 124. In accordance with the selection start signal, the detection result selection unit 127 compares the detection error information of the visible images and the detection error information of the invisible image calculated by the skew detection unit 126, and selects the more accurate one of the skew detection result of the visible images and the skew detection result of the invisible image (step S109).

The detection result selection unit 127 further stores the selected skew detection result in the skew detection result storage unit 128 (step S110). The image processing unit 120 transmits the interrupt notification of the skew detection result to the CPU 140 (step S111).

In parallel with at least the skew detection process of the skew detection unit 126, the output data control unit 120b outputs the visible images subjected to particular image processing to the subsequent image processing unit 130 (step S112).

Thereby, the image processing of the image processing unit 120 is completed. With the above-described process, the image processing of the image processing unit 120 smoothly transitions to the image processing of the image processing unit 130.

Figure 13:
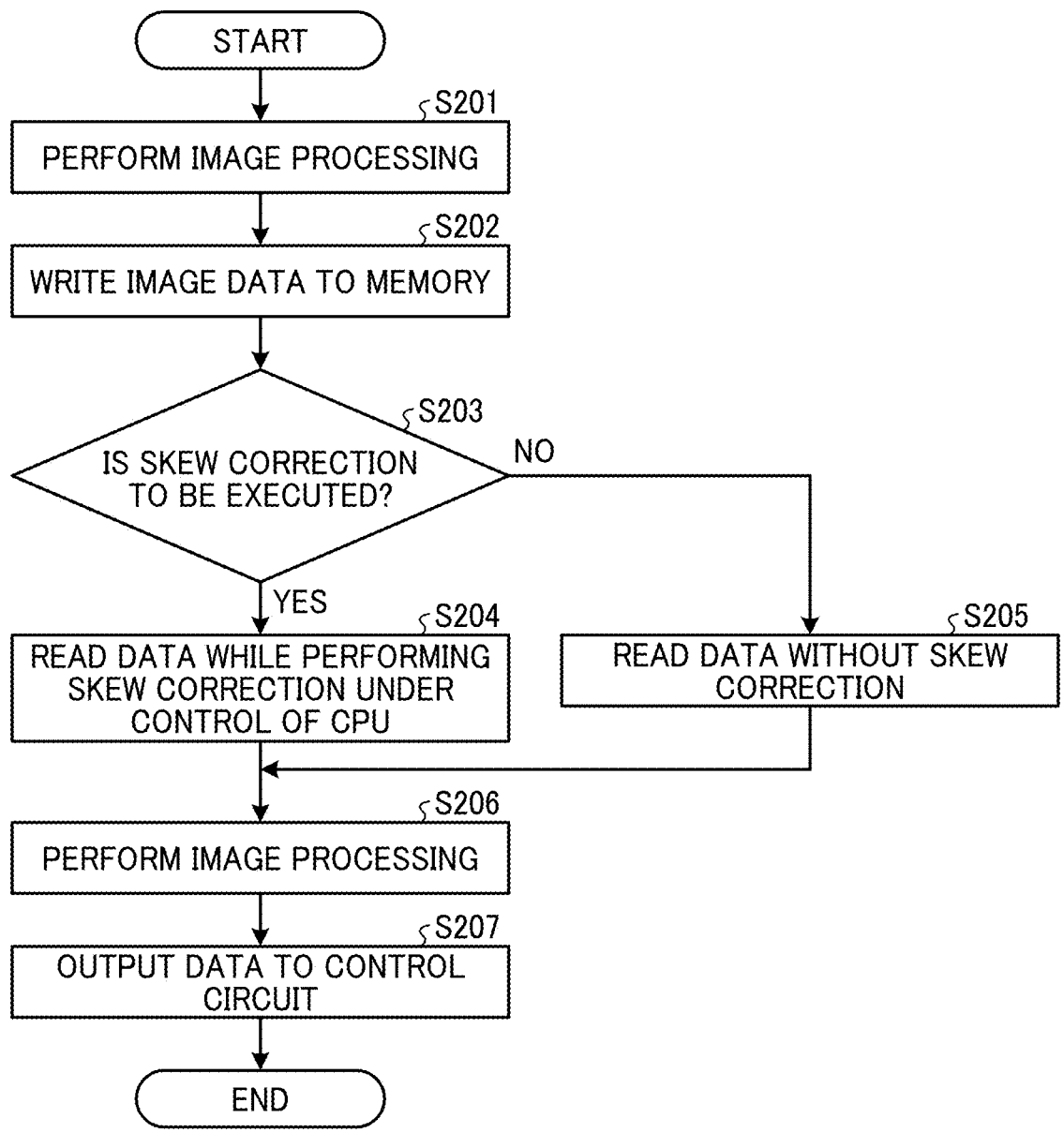
FIG. 13 is a flowchart illustrating an exemplary procedure of image processing by the another image processing unit of the embodiment.

FIG. 13 is a flowchart illustrating an exemplary procedure of the image processing by the image processing unit 130 of the embodiment. As illustrated in FIG. 13, the sub-image processing unit 131 of the image processing unit 130 performs image processing on the visible images of the front surface of the document read by the front surface scanner 111 and transferred from the output data control unit 120b of the image processing unit 120 (step S201). If the visible images of the rear surface of the document are read by the rear surface scanner 112, the sub-image processing unit 131 directly receives the visible images of the rear surface of the document from the rear surface scanner 112, and performs image processing on the visible images of the rear surface of the document similarly to the visible images of the front surface of the document.

The writing unit 132 of the image processing unit 130 divides each of the visible images into a plurality of blocks, and writes the read data of the visible image to the memory 130m by assigning an address to each of the blocks (step S202).

Then, the CPU 140 determines whether there is a skew detection result calculated by the image processing unit 120 and whether to execute the skew correction (step S203). If it is determined that the image processing unit 120 has calculated the skew detection result and that the skew correction is to be executed (YES at step S203), the reading unit 133 reads the blocks of the visible image from the memory 130m in a specified address order under the read address control of the CPU 140. Thereby, the read data is read from the memory 130m by the rotate-and-read method, while being subjected to the skew correction (step S204).

If it is determined that the skew detection by the image processing unit 120 has been skipped and that the skew correction is not to be executed (NO at step S203), the reading remit 133 performs a regular rotate-and-read operation without the skew correction under the read address control of the CPU 140 (step S205). However, the image processing unit 130 may perform, as necessary, the skew detection on the visible images and reflect the skew detection result in the reading of the read data by the reading unit 133.

The sub-image processing unit 134 performs image processing on the read data read from the memory 130m (step S206), and outputs the image-processed read data to the control circuit 151 (step S207).

Thereby, the image processing of the image processing unit 130 is completed. The read data output to the control circuit 151 is stored in the memory 151m. The stored read data is then read and used in the image formation by the printing device 300, for example.

Figure 14:
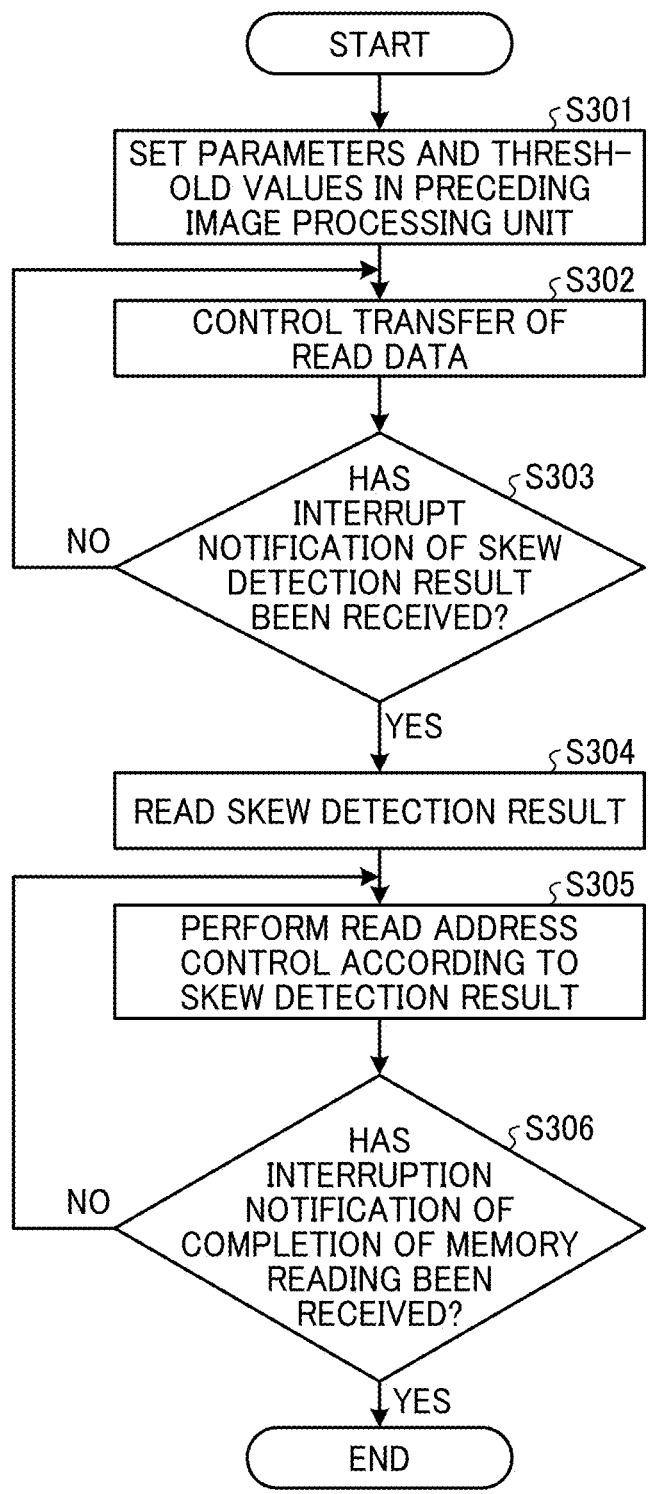
FIG. 14 is a flowchart illustrating an exemplary procedure of controlling the image processing units by a central processing unit of the image reading device of the embodiment.

FIG. 14 is a flowchart illustrating an exemplary procedure of controlling the image processing units 120 and 130 by the CPU 140 of the embodiment. As illustrated in FIG. 14, the CPU 140 previously sets, in the image processing unit 120, the parameters and threshold values related to the skew detection before the start of the operation of the front surface scanner 111, for example (step S301). When the front surface scanner 111 starts reading the document, the CPU 140 controls the transfer of the read data to the image processing unit 120 (step S302).

The CPU 140 determines whether the interrupt notification of the skew detection result has been transmitted from the image processing unit 120 (step S303). If it is determined that the interrupt notification of the skew detection result has not been transmitted from the image processing unit 120 (NO at step S303), the CPU 140 continues the data transfer from the front surface scanner 111 to the image processing unit 120 (step S302).

In response to reception of the interrupt notification of the skew detection result (YES at step S303), the CPU 140 reads the skew detection result from the skew detection result storage unit 128 of the image processing unit 120, and holds the read skew detection result (step S304).

The CPU 140 further performs the read address control according to the skew detection result to cause the reading unit 133 of the image processing unit 130 to perform the reading process in accordance with the rotate-and-read method while performing the skew correction (step S305).

The CPU 140 then determines whether an interrupt notification of the completion of the reading has been transmitted from the image processing unit 130 (step S306). If it is determined that the interrupt notification of the completion of the reading has not been transmitted from the image processing unit 130 (NO at step S306), the CPU 140 allows the reading unit 133 to continue the reading based on the skew detection result (step S305) until the interrupt notification of the completion of the reading is received (YES at step S306).

Thereby, the process of controlling the image processing units 120 and 130 by the CPU 140 is completed.

There is a technique of detecting a skew in data read by a scanner and electrically correcting the skew A typical skew correction technique performs the skew detection by reading the data of three images of R, G, and B and detecting a shadow formed on the boundary between a document and a background area through image processing. According to this technique, however, the accuracy of the skew detection is affected by factors such the sheet type of the document.

In view of the above, there is a technique of performing image processing with four images including the R, G, and B images and an image based on light of a wavelength different from the wavelengths of R, G, and B light beams, such as NIR or UV light. For example, Japanese Unexamined Patent Application Publication No. 2020-053931 discloses a technique of acquiring images with multiple light beams of different wavelengths and correcting the skew of the document tilted in the images.

The publication, however, does not disclose a hardware configuration for performing the above-described process. For example, to process the light of a wavelength different from the wavelengths of R, G, and B light beams, such as NIR light, by applying the technique of the publication to an existing configuration that performs image processing with the three images of R, G, and B, the existing configuration should be substantially changed, which results in a major increase in man-hours and costs.

As described above, it has been difficult to improve the accuracy of the skew detection at low cost with the NIR technique. Further, the image processing with the four images including the NIR image involves various arithmetic processing for calculating the origin coordinates and the tilt angle of the document, for example, thereby increasing the circuit size.

According to the image reading device 100 of the embodiment, on the other hand, the image processing unit 120 calculates the detection result of the tilt of the document in the visible images and the detection result of tilt of the document in the invisible image.

The image processing unit 120 for performing the skew detection is thus provided separately from the image processing unit 130 for performing the regular image processing. Thereby, the image reading device 100 performs the skew detection based on the invisible image as well as the visible images, while utilizing the configuration of the existing image reading device, for example. Consequently, the image reading device 100 highly accurately corrects the angle of the document based on the visible light and invisible light, while preventing a substantial increase in man-hours and costs.

According to the image reading device 100 of the embodiment, the skew detection unit 126 sequentially performs the process of calculating the skew detection result and the detection error information of the visible images and the process of calculating the skew detection result and the detection error information of the invisible image. It is therefore unnecessary to provide in parallel a skew detection unit for performing the skew detection on the visible images and a skew detection unit for performing the skew detection on the invisible image, thereby preventing an increase in circuit size.

According to the image reading device 100 of the embodiment, the internal operation clock frequency of the image processing unit 130 is set to make the speed of reading the read data faster than the speed of writing the read data.

For example, therefore, the writing of the read data by the writing unit 132 and the reading of the read data by the reading unit 133 may be timed to be completed substantially at the same time. Accordingly, even when the image reading device 100 is equipped with the single skew detection unit 126 that sequentially performs the skew detection process on the visible images and the skew detection process on the invisible image, for example, a decline in the overall performance of the image reading device 100 is prevented.

The image reading device 100 of the embodiment further includes the CPU 140 that controls the image processing units 120 and 130. Thereby, the image processing units 120 and 130 are operable in coordination with each other.

According to the image reading device 100 of the embodiment, when the CPU 140 receives an interrupt signal notifying the skew detection result, the reading unit 133 starts reading the read data. The CPU 140 therefore controls the read addresses for reading from the memory 130m based on the skew detection result to cause the reading unit 133 to read the read data while correcting the tilt of the document in the visible images.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image processing device, comprising:
a light source to irradiate a document with light, the light including visible light and invisible light;
a reference plate disposed behind the document to absorb the invisible light, the document reflecting the light;
an image sensor configured to:
receive the light reflected by the document,
capture an image of the document with the light from the light source, the image including a visible image being captured with the visible light and an invisible image being captured with the invisible light, and
generate read data of the image; and
a first image processing circuit configured to:
detect coordinates of a plurality of first points on a boundary area between the document and the reference plate in the visible image based on a shadow of the document cast on the reference plate in the visible image,
detect coordinates of a plurality of second points on the boundary area between the document and the reference plate in the invisible image based on incidence or non-incidence of light from the document and the reference plate in the invisible image,
calculate a first detection result and first detection error information, the first detection result representing a tilt of the document detected in the visible image based on the coordinates of the plurality of first points, and the first detection error information representing accuracy of detection of the tilt of the document in the visible image,
after completion of calculation of the first detection result and the first detection error information, calculate a second detection result and second detection error information, the second detection result representing a tilt of the document detected in the invisible image based on the coordinates of the plurality of second points, and the second detection error information representing accuracy of detection of the tilt of the document in the invisible image, and
select one of the first detection result of the visible image and the second detection result of the invisible image based on the first detection error information and the second detection error information.

2. The image processing device of claim 1, further comprising:
a second image processing circuit configured to:
write the read data of the visible image to a memory, and
after the first image processing circuit selects one of the first detection result of the visible image and the second detection result of the invisible image read the read data from the memory while correcting the tilt of the document in the visible image based on the selected one of the first detection result of the visible image and the second detection result of the invisible image, wherein
the second image processing circuit has an internal operation clock frequency set to make a speed of reading the read data faster than a speed of writing the read data.

3. The image processing device of claim 2, further comprising a control circuit configured to
control the first image processing circuit and the second image processing circuit,
acquire, from the first image processing circuit, the selected one of the first detection result of the visible image and the second detection result of the invisible image, and control a plurality of read addresses for reading from the memory, based on the selected one of the first detection result of the visible image and the second detection result of the invisible image, to control the second image processing circuit to read the read data from the memory while correcting the tilt of the document in the visible image.

4. The image processing device of claim 3, wherein
when the calculation of the first detection result and the calculation of the second detection result are completed, the first image processing circuit outputs an interrupt signal to the control circuit, and
in response to reception of the interrupt signal, the control circuit controls the second image processing circuit to start reading the read data.

5. The image processing device of claim 1, wherein
based on the coordinates of the plurality of first points, the first image processing circuit calculates coordinates of a first intersection point and a first tilt angle as the first detection result, the first intersection point being an intersection point of two adjacent sides of the document in the visible image, and the first tilt angle being an angle of the tilt of the document in the visible image, and
based on the coordinates of the plurality of second points, the first image processing circuit calculates coordinates of a second intersection point and a second tilt angle as the second detection result, the second intersection point being an intersection point of the two adjacent sides of the document in the invisible image, and the second tilt angle being an angle of the tilt of the document in the invisible image.

6. An image processing device, comprising:
a light source to irradiate a document with light, the light including visible light and invisible light;
a reference plate to absorb the invisible light, the reference plate being disposed behind the document reflecting the light;
an image sensor configured to:
receive the light reflected by the document,
capture an image of the document with the light from the light source, the image including a visible image being captured with the visible light and an invisible image being captured with the invisible light, and
generate read data of the image; and
first image processing circuitry including a first edge detection circuit, a second edge detection circuit, a tilt detection circuit and a detection result selection circuit, wherein
the first edge detection circuit detects coordinates of a plurality of first points on a boundary area between the document and the reference plate in the visible image based on a shadow of the document cast on the reference plate in the visible image,
the second edge detection circuit detects coordinates of a plurality of second points on the boundary area between the document and the reference plate in the invisible image based on incidence or non-incidence of light from the document and the reference plate in the invisible image,
the tilt detection circuit is configured to:
calculate a first detection result and first detection error information, the first detection result representing a tilt of the document detected in the visible image based on the coordinates of the plurality of first points, and the first detection error information representing accuracy of detection of the tilt of the document in the visible image, and
after completion of calculation of the first detection result and the first detection error information, calculate a second detection result and second detection error information, the second detection result representing a tilt of the document detected in the invisible image based on the coordinates of the plurality of second points, and the second detection error information representing accuracy of detection of the tilt of the document in the invisible image, and
the detection result selection circuit selects one of the first detection result of the visible image and the second detection result of the invisible image based on the first detection error information and the second detection error information.

7. The image processing device of claim 6, further comprising:
second image processing circuitry including
a writing circuit configured to write the read data of the visible image to a memory, and
a reading circuit configured to read, after the first image processing circuit selects one of the first detection result of the visible image and the second detection result of the invisible image, the read data from the memory while correcting the tilt of the document in the visible image based on the selected one of the first detection result of the visible image and the second detection result of the invisible image, wherein
the second image processing circuitry has an internal operation clock frequency set to make a speed of reading the read data faster than a speed of writing the read data.

8. The image processing device of claim 7, further comprising a control circuit configured to:
control the first image processing circuitry and the second image processing circuitry,
acquire from the first image processing circuitry, the selected one of the first detection result of the visible image and the second detection result of the invisible image, and
control a plurality of read addresses for reading from the memory, based on the selected one of the first detection result of the visible image and the second detection result of the invisible image, to control the reading circuit to read the read data from the memory while correcting the tilt of the document in the visible image.

9. The image processing device of claim 8, wherein
when the calculation of the first detection result and the calculation of the second detection result are completed, the first image processing circuitry outputs an interrupt signal to the control circuit, and
in response to reception of the interrupt signal, the control circuit controls the reading circuit to start reading the read data.

10. The image processing device of claim 6, wherein
based on the coordinates of the plurality of first points, the tilt detection circuit calculates coordinates of a first intersection point and a first tilt angle as the first detection result, the first intersection point being an intersection point of two adjacent sides of the document in the visible image, and the first tilt angle being an angle of the tilt of the document in the visible image, and
based on the coordinates of the plurality of second points, the tilt detection circuit calculates coordinates of a second intersection point and a second tilt angle as the second detection result, the second intersection point being an intersection point of the two adjacent sides of the document in the invisible image, and the second tilt angle being an angle of the tilt of the document in the invisible image.

11. An image processing method performed by an image processing device including a light source to irradiate a document with light, the light including visible light and invisible light, a reference plate for absorbing the invisible light, the reference plate being disposed behind the document reflecting the light, and an image sensor which receives the light reflected by the document, captures an image of the document with the light from the light source, and generates read data of the image, the image including a visible image being captured with the visible light and an invisible image being captured with the invisible light, the image processing method comprising:

detecting coordinates of a plurality of first points on a boundary area between the document and the reference plate in the visible image based on a shadow of the document cast on the reference plate in the visible image;

detecting coordinates of a plurality of second points on the boundary area between the document and the reference plate in the invisible image based on incidence or non-incidence of light from the document and the reference plate in the invisible image;

calculating a first detection result and first detection error information, the first detection result representing a tilt of the document detected in the visible image based on the coordinates of the plurality of first points, and the first detection error information representing accuracy of detection of the tilt of the document in the visible image;

after completion of the calculating the first detection result and the first detection error information, calculating a second detection result and second detection error information, the second detection result representing a tilt of the document detected in the invisible image based on the coordinates of the plurality of second points, and the second detection error information representing accuracy of detection of the tilt of the document in the invisible image; and selecting one of the first detection result of the visible image and the second detection result of the invisible image based on the first detection error information and the second detection error information.

* * * * *